United States Patent

[11] 3,602,877

[72] Inventors William E. Currie;
Ilmar G. Raudsep, both of Seattle, Wash.
[21] Appl. No. 788,905
[22] Filed Jan. 3, 1969
[45] Patented Aug. 31, 1971
[73] Assignee Honeywell Inc.
Minneapolis, Minn.

[54] UNDERWATER POSITION DETERMINING SYSTEM
3 Claims, 2 Drawing Figs.
[52] U.S. Cl. .................................................... 340/6 R, 340/3 C
[51] Int. Cl. ................................................. G01s 3/100
[50] Field of Search ............................................ 340/3, 3 A, 5, 6, 3 C; 343/112 D

[56] References Cited
UNITED STATES PATENTS
2,739,296  3/1956  Woodard ...................... 340/3
3,160,850  12/1964  Dudley ........................ 340/6

Primary Examiner—Richard A. Farley
Attorneys—Charles J. Ungemach, Ronald T. Reiling and Charles L. Rubow ABSTRACT: Apparatus for determining and displaying the angular position of a water craft relative to a fixed underwater location; and a method for determining distances therebetween if the depth of the fixed location is known. The apparatus comprises a directional receiver and circuitry on the water craft for determining the azimuth and depression angle of a sonar source at the fixed location relative to the water craft, and means for displaying these angles independently on a polar coordinate system.

UNDERWATER POSITION DETERMINING SYSTEM

The present invention is concerned generally with electronics and more specifically with sonar locating apparatus.

The prior art has illustrated many methods of locating a sonar source. However, the information supplied normally indicated only the azimuth bearing angle and not the depression angle. When the depression angle was indicated, there still was no method of determining the distance to the sonar source unless the receiving set was synchronized with the source so that a determination could be made as to the time difference between transmission of a signal and reception by the receiving unit. This type of operation of course required complicated circuitry in at least the receiver. The present invention on the other hand has no synchronization between the receiving unit and the transmitting unit. The distance is determined through a simple mathematical computation involving the depression angle of the sonar transmitter with respect to the receiver and the previously known depth of the transmitter.

It is of course within the scope of this invention that the coded output of the transmitter may change with depth if a transmitter cannot be positioned at a particular stationary depth. Since the receiving unit contains apparatus for detecting various frequency codes, the operator merely has to locate the source in a broadband receiving mode and then selectively determine the frequency or code being transmitted. This frequency or code is indicative of the particular depth at which the transmitter is operating.

It is therefore an object of the present invention to provide an improved angular position locating, tracking, or object detecting device.

Further objects and advantages of this invention may be ascertained from a reading of the specification and appended claims in conjunction with the drawings wherein:

Figure 1:
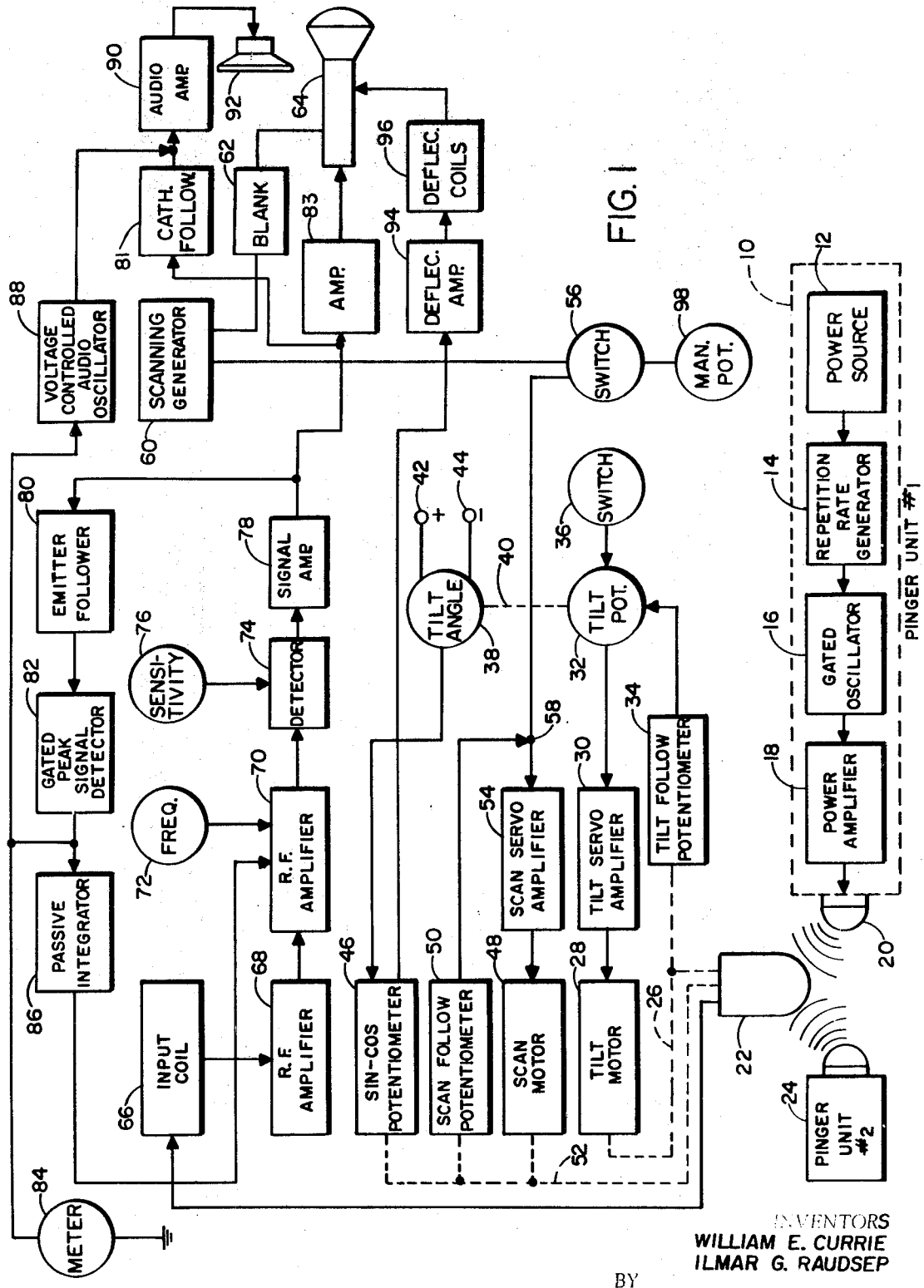
FIG. 1 is a block diagram of a receiver unit with two transmitting units.

In FIG. 1, a first pinger unit, transmitter or sonar source 10 is shown in dashed lines and contains a power source 12, a repetition rate generator 14, a gated oscillator 16 and a power amplifier 18. Repetition rate generator 14 controls the time period or length of transmission and the frequency of these time periods. The gated oscillator 16 may be manually adjustable in frequency or, if desired, can be frequency dependent upon some condition such as depth. Any coding may involve other variables such as time periods or repetition rate. The gated oscillator 16 supplies its output signal through a power amplifier to a transducer 20 which supplies sonar signals to a receiving transducer 22. A second pinger unit 24, which normally is similar in construction to unit 10, is also shown supplying signals to receiving transducer 22.

The transducer 22 has a first mechanical input shown as dashed line 26 from a tilt motor 28 which receives its signals from a tilt servoamplifier 30. The tilt servoamplifier 30 is in turn controlled by input signals from a tilt potentiometer 32. A tilt follow potentiometer 34 is mechanically connected to the output of tilt motor 28 and supplies feedback signals to the tilt potentiometer 32. The tilt potentiometer 32 is energized by a switch 36. A mechanical connection from tilt potentiometer 32 to a tilt angle generator 38 is shown as dashed line 40. Tilt angle generator 38 contains positive and negative inputs 42 and 44 respectively. An output from tilt angle generator 38 is supplied to a sine-cosine potentiometer 46 which is mechanically connected to the output of a scan motor 48 and to a scan follow potentiometer 50. The scan motor 48 supplies mechanical signals to transducer 22 through a mechanical connection shown as dashed line 52. The tilt motor adjusts the transducer in depression angle, while the scan motor adjusts the transducer in azimuth.

Scan motor 48 receives its signals from a scan servoamplifier 54 which in turn is controlled from a switch 56. A manual potentiometer or scanning control 98 is also connected to amplifier 54 through switch 56. The signals from switch 56 are summed with feedback signals from scan follow potentiometer 50 at a summing point 58. A scanning generator 60 supplies the signals to the scan servoamplifier 54 through the switch 56. The scan generator also supplies an output through a blanking circuit 62 to a PPI, display means or oscilloscope 64.

The transducer 22 supplies electrical signals to an input coil 66 which supplies an output through a first RF amplifier 68 to a second RF amplifier 70 which is frequency adjustable through a frequency control 72. RF amplifier 70 acts to some extent as a band-pass filter. Output signals from amplifier 70 are passed through a detector 74 which is adjusted in sensitivity by a control 76 to a signal amplifier 78. Output signals from the amplifier 78 are supplied to an emitter follower 80, a cathode follower 81, and an amplifier 83. Amplifier 83 supplies signals directly to the PPI display 64. The emitter follower 80 supplies a signal to a gated peak signal detector 82 whose output is supplied to a meter 84, a passive integrator 86, and a voltage controlled audio oscillator 88.

The meter 84 provides an indication of the amplitude of the signals supplied to PPI display 64 so that a determination can be made when the transducer 22 is pointed directly at the desired pinger unit. The passive integrator 86 stores the received signals from the detector 82 and passes a feedback signal indicative thereof to RF amplifier 70 so as to provide a partial automatic gain control circuit. The voltage controlled oscillator 88 supplies signals to an audio amplifier 90 which is connected to a speaker 92. Thus, both audio and visual indication will be obtained of the amplitude of the signals being received. The cathode follower 81 also supplies inputs to the audio amplifier 90, thus causing speaker 92 to produce a slowly changing frequency output signal accompanied by a pulse of sound upon reception of an individual transmission. Outputs from the sine-cosine potentiometer 46 are supplied through a deflection amplifier 94 to deflection coils 96 of the PPI display 64. The deflection coils 96 control the deflection of the signal which is generated by the pinger unit 10 and transmitted through the transducer 22 to the amplifier 83.

Operation

In operation the pinger unit 10 supplies output sonar signals which are received by transducer 22 and transmitted to the input coil 66. These are amplified by amplifier 68 and pass through amplifier 70, if it adjusted to pass such signals by the frequency control 72, to detector 74. Detector 74 is adjusted by sensitivity control 76 to pass only signals of greater than the selected amplitude. This signal is then passed through the amplifiers 78 and 83 to the display unit 64 to produce a visible pulse signal thereon. The sensitivity control 76 is used to prevent reception of signals from pingers farther away than desirable, and also to cut down unwanted background noises which might show up on the display, if the pinger unit is close enough to overcome all other received signals.

In the automatic scanning mode the scanning generator 60 supplies a signal through switch 56 to the scan motor 48 which sweeps the transducer 22 through the full desired scan in azimuth. The tilt or depression adjustment is made through tilt potentiometer 32 to adjust the tilt angle of the transducer 22. When a signal is received from a pinger unit, the scan, servoamplifier may be switched by switch 56 to receive manual scan signals from potentiometer 98 to more accurately position the transducer for reception of maximum amplitude input signals as may be ascertained visually from meter 84 or auditorily from speaker 92.

In most cases the depth of the pinger unit will be known and thus the distance to the pinger unit can be determined by dividing the known depth by the sine of the angle indicated by the tilt potentiometer 32.

Figure 2:
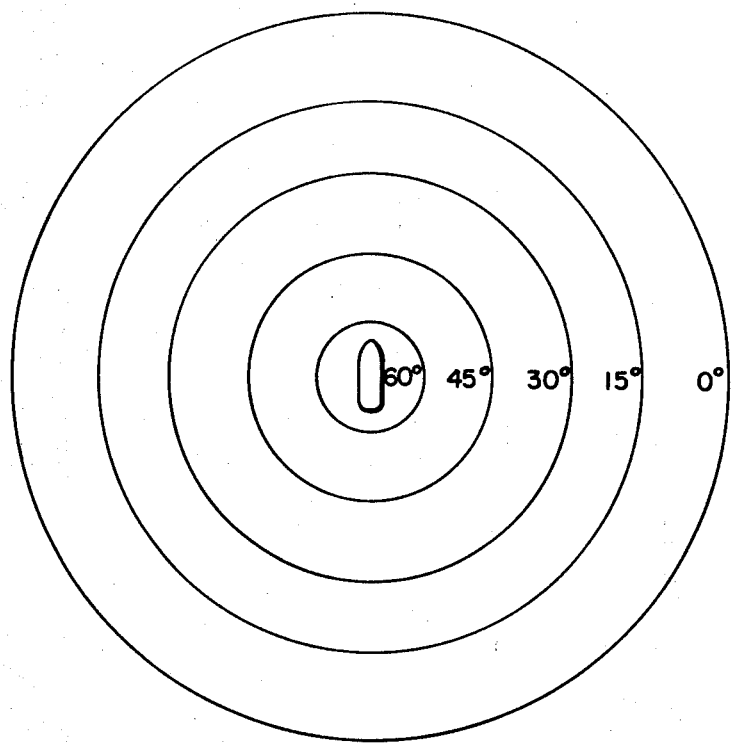
FIG. 2 is an illustration of one means of presenting information as to the angular position transmitter or sonar source with respect to the receiver.

Alternately, or in addition, the PPI display of FIG. 2 can be utilized to determine the tilt angle. Tilt potentiometer 32 and tilt angle generator 38 are cooperatively calibrated, and the maximum amplitude signals supplied to the deflection coils 96 from sine, cosine potentiometer 46 are regulated by the tilt angle generator 38. Thus, a fairly accurate indication of the angle of the transducer can be obtained from the PPI display of FIG. 2 by checking the position of the spot or pulse relative to the various circles designated as degree lines from 0° to 60°. Specifically, 0° indicates horizontal direction of signal reception while 90° indicates vertical direction. When the spot indicating signal reception appears exactly in the center of the display, it is known that the vessel having the receiving unit is directly over a given pinger unit.

If there is more than one pinger unit in a given area, the frequency adjust control 72 is first changed to a position which allows passage of all pinger signals to the display unit 64. When a pinger signal is received, the control 72 can then be adjusted to select the frequency or code of the desired pinger to check whether or not signals are being received from the correct pinger unit.

The system can be used also for merely locating a particular position in the ocean by finding a particular frequency pinger on the display and maneuvering the vessel while keeping the transducer 22 pointed at the pinger unit until the pulses are positioned directly in the center of the PPI display. This will mean that the vessel is located directly over the pinger unit, thus accurately establishing a previously known position.

While normally the depth of the pinger unit of a particular frequency or particular code will be known, in some instances this may be variable, as when it is carried by a diver, etc. In such an instance it may be desirable to know the distance to this unit. This can be accomplished by making the frequency of the gated oscillator 16 variable with depth. In one embodiment, the depth can be ascertained by repositioning of the frequency control knob 72 after the pinger unit is once located so as to determine the depth in accordance with the main frequency component of the received signal. Since the angle to the particular pinger unit is known either by the tilt potentiometer 32 or the indication on the display surface of PPI 64, and since the depth can be determined from the control 72, the direct distance to the pinger can be determined as previously indicated, by dividing the known depth by the sine of the angle. If horizontal distance is desired the depth is divided by the tangent of the angle, or multiplied by its cotangent.

It will be realized that while the block diagram of the receiver is fairly complicated, many of the components can be eliminated without destroying the basic invention. As an example, the automatic gain control circuitry, the meter, or the speaker are not necessary, but only desirable additions. The same is true of the automatic scanning generator and various other features.

We claim:

1. Apparatus for displaying the angular position of a water craft relative to a fixed underwater location comprising:
   a source of compressional wave energy positioned at the fixed underwater location;
   directional receiving means for producing a first signal when oriented toward said source;
   mounting means for mounting said directional receiving means on a water craft for independent rotation about horizontal and vertical axes;
   signal means associated with said mounting means for producing second and third signals respectively indicative of the depression angle and azimuth of said receiving means relative to the water craft; and
   display means connected to receive the first, second and third signals, and operable to provide a visible polar display in response to the first signal wherein said depression angle is represented by radial distance from a fixed point on the face of said display means and said azimuth is represented by angular displacement from a fixed radius on the face of said display means.

2. The apparatus of claim 1 wherein said mounting means includes means for automatically scanning said directional receiving means about said vertical axis.

3. The apparatus of claim 1 further including means for adjusting said receiving means so that the first signal is produced only when said source radiates energy having predetermined characteristics.